US011473604B2

(12) United States Patent
Blakley et al.

(10) Patent No.: US 11,473,604 B2
(45) Date of Patent: Oct. 18, 2022

(54) WALL ANCHOR

(71) Applicant: LIVEWELL HOME SAFETY SOLUTIONS LLC, Strongsville, OH (US)

(72) Inventors: Scott Blakley, Strongsville, OH (US); Lynn VanDyke, Clearfield, UT (US)

(73) Assignee: LIVEWELL HOME SAFETY SOLUTIONS LLC, Strongsville, OH (US)

(*) Notice: Subject to any disclaimer, the term of this patent is extended or adjusted under 35 U.S.C. 154(b) by 219 days.

(21) Appl. No.: 16/725,114

(22) Filed: Dec. 23, 2019

(65) Prior Publication Data
US 2020/0208666 A1 Jul. 2, 2020

Related U.S. Application Data

(60) Provisional application No. 62/784,933, filed on Dec. 26, 2018.

(51) Int. Cl.
F16B 13/08 (2006.01)

(52) U.S. Cl.
CPC .................. F16B 13/0825 (2013.01)

(58) Field of Classification Search
CPC .................................... F16B 13/0808
USPC .................. 411/340–345, 907, 347
See application file for complete search history.

(56) References Cited

U.S. PATENT DOCUMENTS

| | | | | |
|---|---|---|---|---|
| 1,521,025 A * | 12/1924 | Hubener | ................. | F16B 37/04 411/965 |
| 1,521,026 A * | 12/1924 | Hubener | ............. | F16B 13/0808 411/965 |
| 2,203,146 A | 6/1940 | Hexdall | | |
| 2,567,372 A | 9/1951 | Gelpcke | | |
| 2,775,154 A * | 12/1956 | Leaphart, Sr. | .......... | F16B 21/10 411/341 |
| 4,714,366 A * | 12/1987 | Boudrot | .................... | B42F 3/04 402/13 |
| 5,061,137 A * | 10/1991 | Gourd | ................... | F16B 21/088 411/908 |
| 2004/0170486 A1 * | 9/2004 | DeMeo | ............... | F16B 13/0808 411/340 |
| 2011/0150601 A1 | 6/2011 | Wiggins et al. | | |
| 2011/0271635 A1 | 11/2011 | Kearl et al. | | |
| 2012/0328392 A1 | 12/2012 | Difante | | |
| 2015/0043989 A1 * | 2/2015 | Lind | ................... | F16B 13/0808 411/80.1 |
| 2018/0112697 A1 | 4/2018 | Williams | | |

FOREIGN PATENT DOCUMENTS

WO WO8606446 A1 11/1986

OTHER PUBLICATIONS

International Search Report and Written Opinion for PCT/US2019/068513; dated Mar. 24, 2020; 11 pages.

* cited by examiner

Primary Examiner — Flemming Saether
(74) Attorney, Agent, or Firm — Taft Stettinius & Hollister LLP; Derek B. Lavender

(57) ABSTRACT

A wall anchor assembly with a sleeve and an anchor elastically coupled to the sleeve with an elastic member. Wherein, the elastic member defines a sleeve coupling portion that is substantially circular and couples the elastic member to the sleeve.

12 Claims, 5 Drawing Sheets

WALL ANCHOR

CROSS-REFERENCE TO RELATED APPLICATION

The present application claims the benefit of U.S. Provisional Application No. 62/784,933 filed on Dec. 26, 2018, the contents of which are hereby incorporated herein in entirety.

FIELD OF THE DISCLOSURE

The present disclosure relates to a wall anchor, and more specifically to a wall anchor that is coupled to a sleeve with an elastic member.

BACKGROUND

Walls are frequently constructed by attaching drywall panels to studs. For example, structures attached to wall mounting systems that are attached to drywall (i.e., located away from studs or joists) are dependent on the mounting system attached only to the drywall to support both static loads (e.g., an ornamental object) and dynamic loads (e.g., an individual holding a grab bar). If the wall mounting system is weak, for example, the ornamental object can fall or the individual can lose their balance if the mounting system gives way.

In addition, it is important that the structural component located on the inner side of the drywall be large enough to distribute the load over a wide surface area to increase the load bearing capacity of the drywall panel. Conventional fasteners, such as screws and bolts, are not effective when used with drywall unless they are inserted through the drywall into studs or joists.

Many conventional wall anchors require large holes to be drilled through the drywall or other wall material to allow the anchor to become positioned on the opposing side. The large holes created by the conventional wall anchor is not ideal when the wall anchor is subsequently removed or otherwise no longer needed. In this situation, the large hole left by the wall anchor may be difficult to patch or otherwise hide. Similarly, conventional wall anchors that require a large hole also require trim or the like around the component held by the anchor to adequately cover the hole in the wall. Accordingly, the large hole of the conventional anchor requires a correspondingly large trim member.

Consequently, there is a need for a wall mounting system for attaching articles to drywall panels or the like that is easily installed and requires a minimal hole there through.

SUMMARY

One embodiment is a wall anchor assembly that has a sleeve, an anchor elastically coupled to the sleeve with an elastic member. Wherein, the elastic member defines a sleeve coupling portion that is substantially circular and couples the elastic member to the sleeve.

In one example of this embodiment, the sleeve defines an elastic member receiver therein. In one aspect of this example, the elastic member receiver has at least one channel defined therein, the channel sized to at least partially receive the sleeve coupling portion. In another aspect of this example, the elastic member receiver couples the sleeve coupling portion of the elastic member around a sleeve axis defined by the sleeve.

In another example, the elastic member receiver has a first channel and a second channel defined therein, the first and second channel sized to at least partially receive the sleeve coupling portion of the elastic member. One aspect of this example includes at least one retention tab defined in the elastic member receiver, wherein the retention tab at least partially prevents the sleeve coupling portion from being removed from the first or second channel. In another aspect of this example, the first and second channels are substantially arc-shaped and separated from one another by a first longitudinal opening and a second longitudinal opening. In part of this aspect, the sleeve coupling portion of the elastic member is coupled to an anchor coupling portion of the elastic member by a first and second extension, wherein the first extension is at least partially positioned in the first longitudinal opening and the second extension is at least partially positioned in the second longitudinal opening. In another aspect of this example, the anchor coupling portion of the elastic member is coupled at least partially around the anchor.

In yet another example, the sleeve defines a through-hole and the anchor has a width, wherein the through-hole and width are sized so the anchor cannot be transitioned through the through-hole.

Another embodiment is an assembly for anchoring a component to a structure. The assembly has an anchor having an anchor width, a sleeve having a through hole defined there through and an elastic member coupling the anchor to the sleeve. Wherein, the width of the anchor is greater than the through hole of the sleeve.

In one example of this embodiment, the elastic member has a sleeve coupling portion that is removably coupleable to the sleeve. In another example, the sleeve has a sleeve width that is about the same as the anchor width. In yet another example, the anchor is configured to be positioned entirely through a through hole in a structure before the sleeve is at least partially positioned within the through hole.

In another example of this embodiment, the elastic member has a sleeve coupling portion that is selectably coupleable to the sleeve and an anchor coupling portion that is selectively coupleable to the anchor. In one aspect of this example a coupler is positionable at least partially through the sleeve and the anchor, wherein the elastic member substantially entirely surrounds the coupler at the sleeve coupling portion and the anchor coupling portion.

Yet another embodiment of this disclosure is a method for instructing the installation of a wall anchor. The method includes providing a wall anchor assembly having a sleeve coupleable to an anchor with an elastic member, a coupler, and instructions. The instructions include the steps of ensuring the sleeve is coupled to the anchor with the elastic member, creating a through hole in a structure, positioning the anchor through the through hole outside of the sleeve and at least partially expanding the elastic member, positioning the sleeve at least partially in the through hole once the anchor is substantially positioned through the through hole, and positioning the coupler through the sleeve and coupling the coupler to the anchor.

One example of this embodiment includes the step of ensuring a sleeve coupling portion of the elastic member is positioned in an elastic member receiver of the sleeve. Another example includes the step of ensuring an anchor coupling portion of the elastic member is positioned in an elastic member receiver of the anchor. Yet another example includes the step of coupling a trim component to the anchor with the coupler.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

Figure 1:
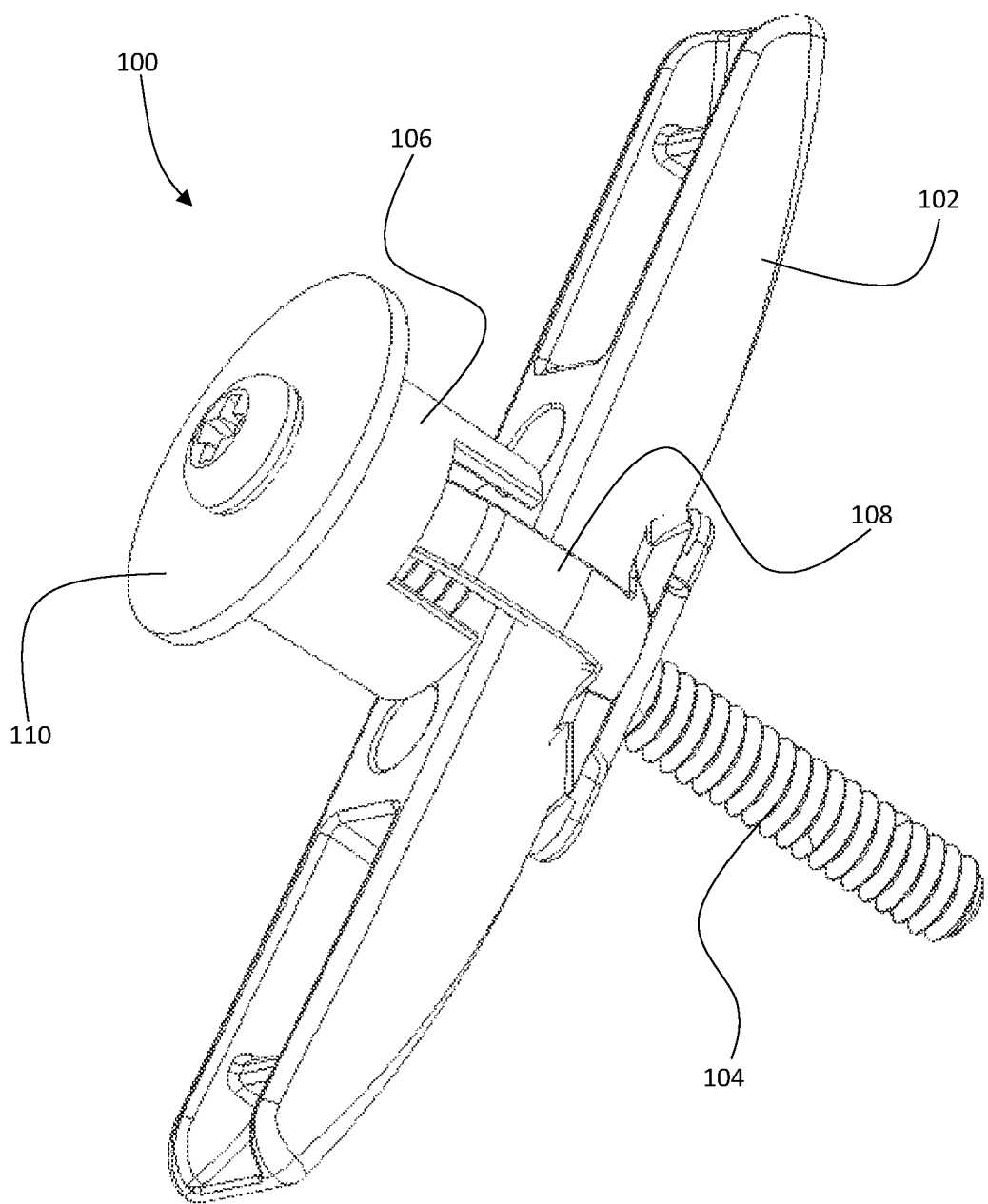
FIG. 1 is an elevated perspective view of a wall anchor assembly.

For the purposes of promoting an understanding of the principles of the present disclosure, reference will now be made to the embodiments described herein and illustrated in the drawings and specific language will be used to describe the same. It will nevertheless be understood that no limitation of the scope of the present disclosure is thereby intended, such alterations and further modifications in the illustrated devices and methods, and such further applications of the principles of the present disclosure as illustrated therein being contemplated as would normally occur to one skilled in the art to which the present disclosure relates.

Referring to FIG. 1, an anchor assembly 100 is illustrated. The anchor assembly 100 may be configured to couple a component to a hollow wall. More specifically, the anchor assembly 100 may have an anchor 102 that may be positionable within a hollow chamber of the wall to allow a component to be fastened thereto via a coupler 104 coupled to the anchor 102. In one non-exclusive example, the wall may be assembled from wood studs and drywall as is known in the art. The anchor assembly 100 may be sized to allow the anchor 102 to become positioned on an inner side of the drywall to allow the coupler 104 to couple the component to the drywall.

In one aspect of this disclosure, the anchor 102 may be coupled to a sleeve 106 with an elastic member 108. The sleeve 106 and elastic member 108 may be configured to elastically couple the anchor 102 to a through hole in the drywall or the like during installation. More specifically, in one aspect of this disclosure the anchor assembly 100 is installed into a through-hole in the wall. Prior to installing the anchor assembly 100, a through-hole may be formed through the wall to allow the anchor 102 to become positioned on an inner side of the wall (i.e. along the surface of the wall in the hollow portion of the wall). The through hole may be sized to correspond with a diameter of the sleeve 106 so the sleeve 106 may be positioned at least partially within the through hole.

The anchor 102 may have a coupler receiving portion defined therein. The coupler receiving portion may be configured to correspond with the coupler 104 to couple the coupler 104 to the anchor 102. In one non-exclusive example, the coupler 104 may be a threaded screw and the coupler receiving portion of the anchor 102 may have a corresponding thread pattern defined therein to receive the coupler 104 via threaded engagement. The coupler receiving portion may be defined directly in the material of the anchor 102 or the coupler receiving portion may be a nut or the like positioned within the anchor 102 among other things.

The anchor 102 and coupler 104 may be substantially perpendicular to one another when coupled together. This orientation ensures that the anchor 102 is positioned along the inner surface of the wall when the coupler 104 is positioned through the through hole of the wall and coupled to the anchor 102. While a perpendicular orientation of the coupler 104 and the anchor 102 is discussed herein, this disclosure also contemplates angularly offsetting the coupler 104 from the anchor 102 when coupled thereto.

A trim piece 110 may be positioned between a head of the coupler 104 and the sleeve 106. The trim piece 110 may be a washer or the like and sized to have a diameter that is greater than the diameter of the sleeve 106 and the through hole of the wall. The trim piece 110 may have a decorative finish to cover the through hole and sleeve 106 and provide a surface to compress the wall between the trim 110 and the anchor 102. In other words, the trim piece 110 may be positioned on at least a portion of the outer surface of the wall and the anchor 102 may be positioned on at least a portion of the inner surface of the wall. The coupler 104 may be manipulated to apply a compressive load to the trim 110 and the anchor 102 sandwiching the wall there between.

Figure 2:
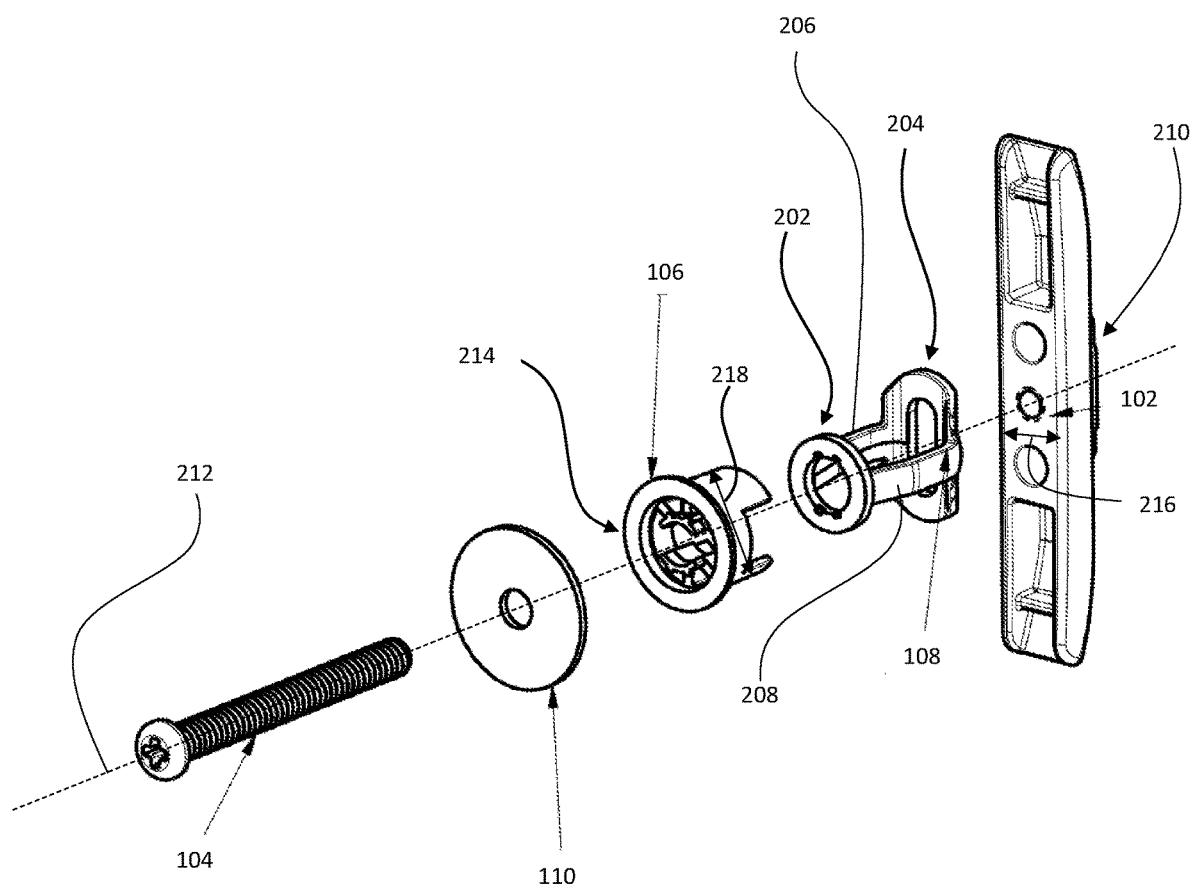
FIG. 2 is an exploded elevated perspective view of the wall anchor assembly of FIG. 1.

Referring now to FIG. 2, an exploded view of the anchor assembly 100 is illustrated. In the exploded view, the elastic member 108 is illustrated uncoupled from the sleeve 106 and the anchor 102. More specifically, the elastic member 108 may have a sleeve coupling portion 202 and an anchor coupling portion 204 coupled to one another by a first and second extension 206, 208. The anchor coupling portion 204 may be sized to be coupled to the anchor 102 at an elastic member receiver 210. In one aspect of this disclosure, the elastic member 108 may be formed of a material capable of substantial elastic deformation, such as rubber or the like. Further, the elastic member receiver 210 may be sized so the anchor coupling portion 204 is positioned there around and substantially restricted from moving away therefrom.

The sleeve coupling portion 202 may be a substantially circular portion of the elastic member 108 that is defined around a coupler axis 212. The sleeve coupling portion 202 is sized to correspond with an elastic member receiver 214 defined in the sleeve 106. More specifically, the sleeve coupling portion 202 is sized to be positioned at least partially in the elastic member receiver 214 to thereby couple the sleeve coupling portion 202 to the sleeve 106.

Figure 3:
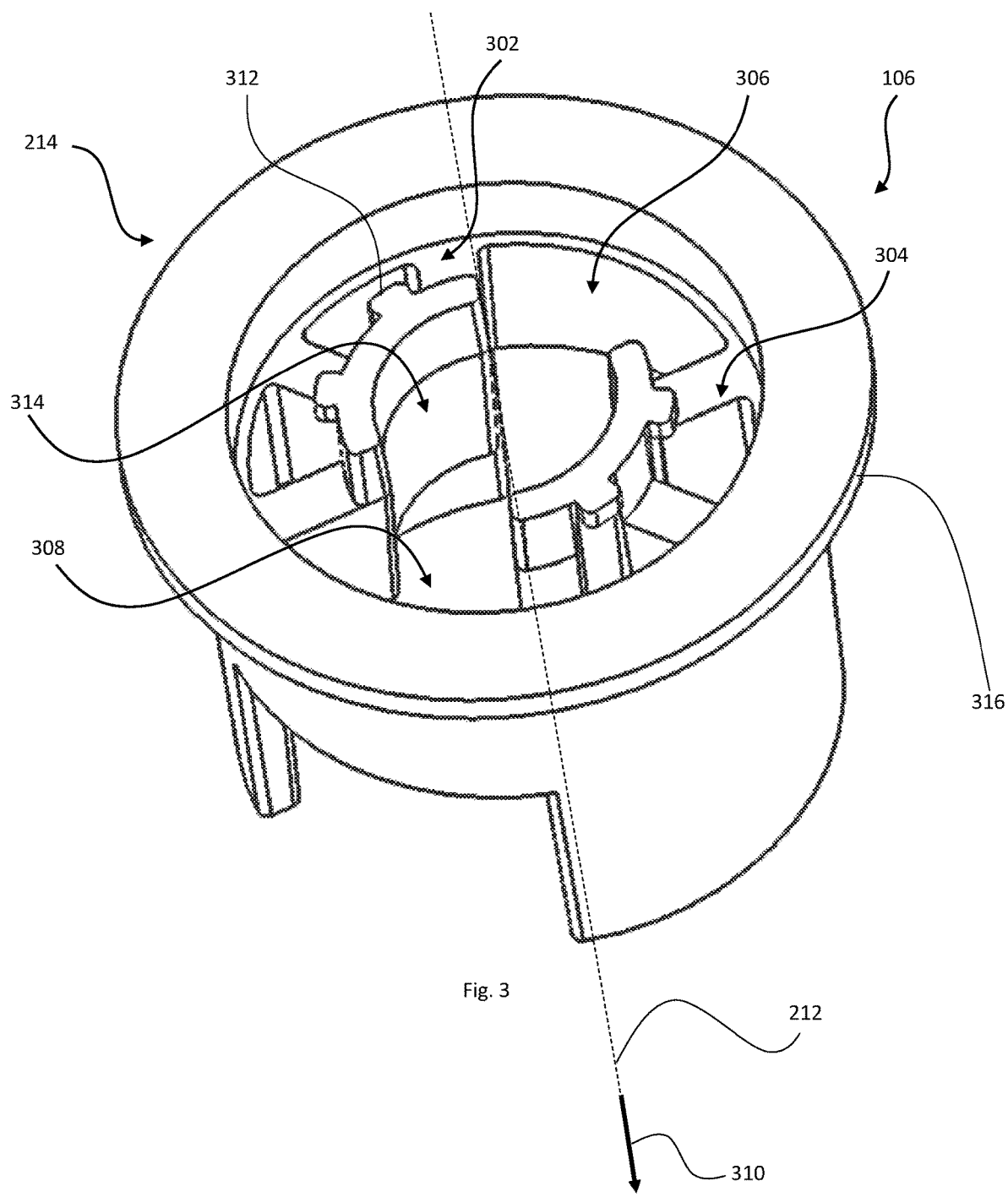
FIG. 3 is an elevated perspective view of a sleeve from the wall anchor assembly of FIG. 1.
Figure 4:
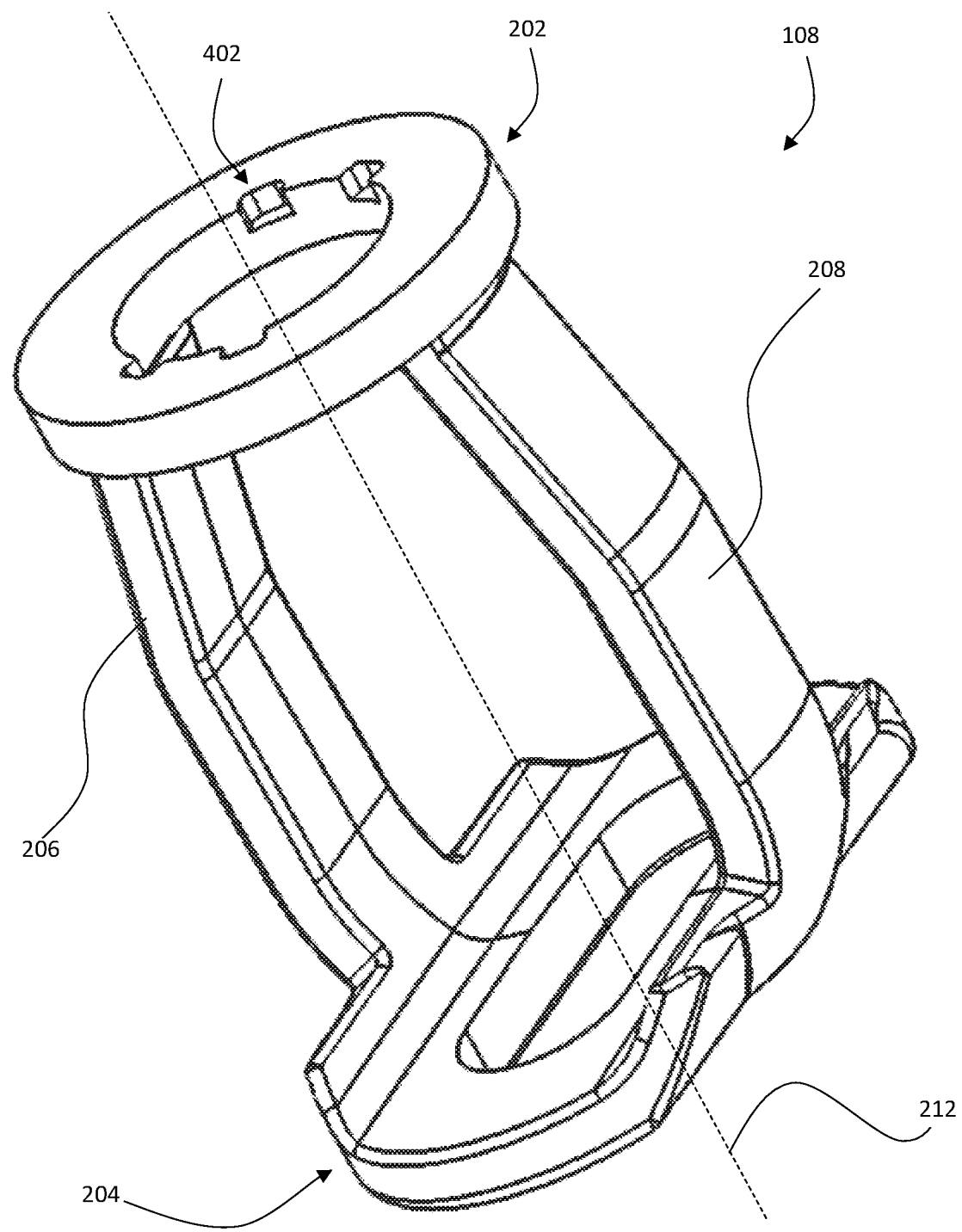
FIG. 4 is an elevated perspective view of an elastic member of the wall anchor assembly of FIG. 1.

Referring now to FIG. 3, the sleeve 106 is illustrated isolated from the remaining components of the anchor assembly. More specifically, the elastic member receiver 214 is more clearly illustrated. The elastic member receiver 214 may have a first channel 302 and a second channel 304 defined therein. The first and second channels 302, 304 may be arcuate channels formed in the elastic member receiver 214 about the coupler axis 212. The first and second channels 302, 304 may terminate at first and second longitudinal opening 306, 308.

In one aspect of this disclosure, the sleeve coupling portion 202 of the elastic member 108 may be positioned at least partially in each of the first and second channels 302, 304. Further, when the sleeve coupling portion 202 is positioned in the channels 302, 304, the first and second extension 206, 208 of the elastic member 108 may be at least partially positioned through the corresponding first and second longitudinal opening 306, 308. Accordingly, when the elastic member 108 is coupled to the elastic member receiver 214 as discussed herein, the elastic member 108 may remain coupled to the sleeve 106 while the elastic member 108 is stretched or otherwise deformed in a first direction 310.

Each channel 302, 304 may also have one or more retention tab 312 defined thereby. The retention tab 312 may be positioned by the opening of the corresponding channel 302, 304 and sized to partially restrict access to the corresponding channel 302, 304. More specifically, the retention tabs 312 may extend partially into a portion of the corresponding channel 302, 304 to thereby restrict the sleeve coupling portion 202 from easily being removed from the corresponding channels 302, 304. In other words, the retention tab 312 may partially contact part of the sleeve coupling portion 202 to ensure that the elastic member 108 remains properly coupled to the sleeve 106. In one non-exclusive example of this embodiment, the sleeve coupling portion 202 may have divots 402 defined therein to correspond with the retention tabs 312.

The sleeve 106 may also define a through hole 314. The through hole 314 may be defined through a central portion of the sleeve 106 along the coupler axis 212. The through hole 314 may be sufficiently sized to allow the coupler 104 to be positioned there through. In other words, the through hole 314 may have a diameter that is the same or slightly larger than the diameter of the coupler 104. Further, the through hole 314 may provide an opening that is smaller than an anchor width 216. That is to say, the through hole 314 may be large enough to allow a portion of the coupler 104 to pass there through but small enough to substantially restrict the anchor 102 from passing there through.

The sleeve 106 may also have a sleeve width 218 along an outer portion of the sleeve 106 and a flange 316 extending radially away therefrom. The flange 316 may be defined about the coupler axis 212 on the portion of the sleeve 106 intended to be along the outer surface of the wall. The flange 316 may be a radial extension of the sleeve 106 that is intended to contact the outer surface of the wall when the sleeve 106 is positioned partially into the through hole. The flange 316 may prevent the sleeve 106 from becoming positioned within the inner cavity of the wall by substantially restricting the sleeve 106 from passing through the through hole of the wall. In other words, the through hole of the wall will have a diameter that corresponds with a main body of the sleeve 106 but the flange 316 may be a radial extension of the sleeve 106 that terminates at a diameter that is greater than the diameter of the through hole.

Figure 5:
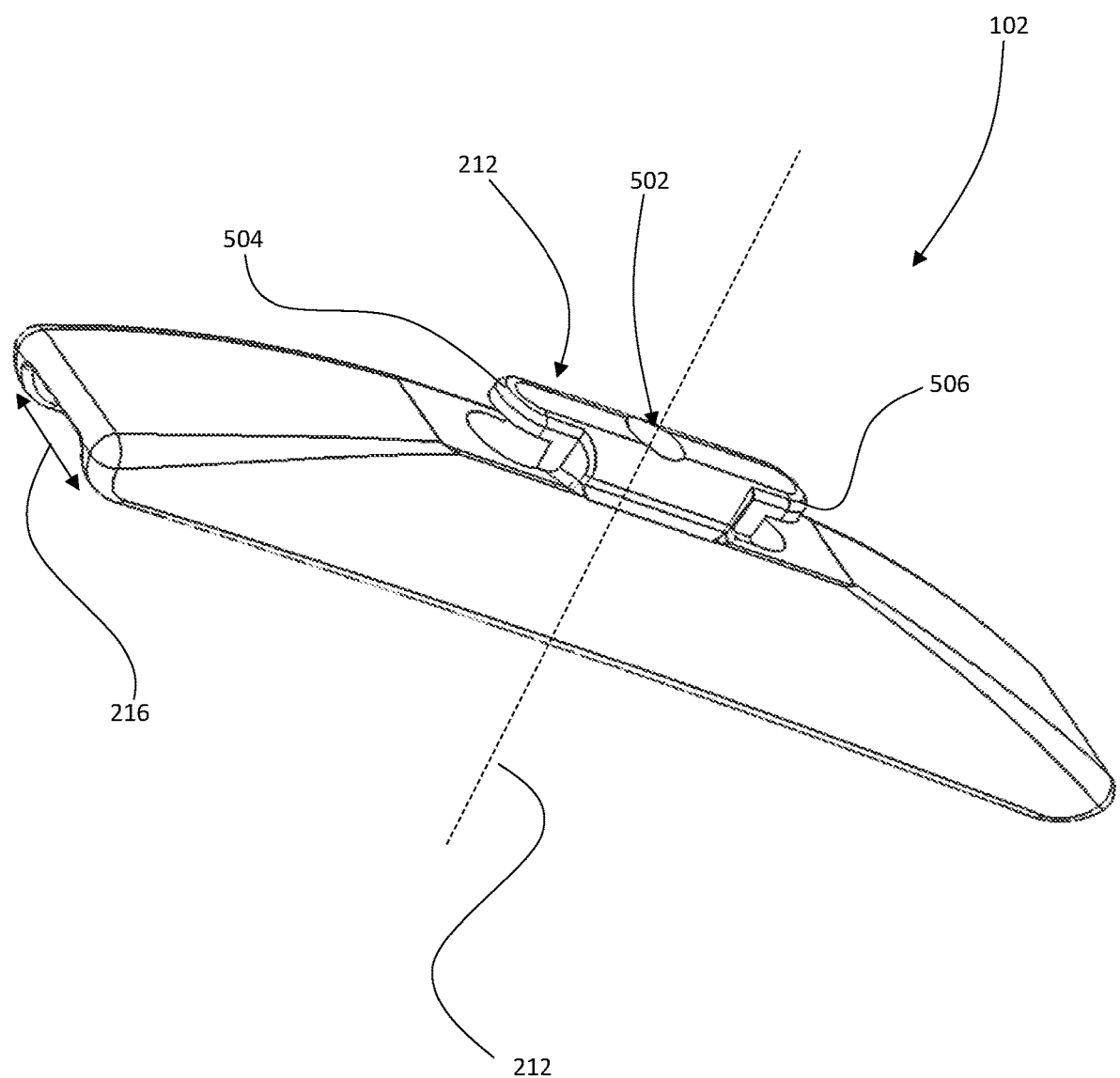
FIG. 5 is an elevated perspective view of an anchor from the wall anchor assembly of FIG. 1.

Referring now to FIG. 5, the Anchor 102 is illustrated isolated from the remaining components of the anchor assembly. As illustrated in FIG. 5, the elastic member receiver 212 may have a first and second overhang 504, 506. The first and second overhang 504, 506 may be sized so the anchor coupling portion 204 of the elastic member 108 can be positioned partially around the elastic member receiver 212 with portions of the anchor coupling portion 204 positioned between the overhangs 504, 506 and the remaining body of the anchor 102. In this configuration, the elastic member 108 may be manipulated without being removed from the elastic member receiver 212. That is to say, the elastic member receiver 212 may maintain coupling with the elastic member 108 even while the elastic member is deformed during installation.

The anchor 102 may also define a coupler through hole 502 therein. The coupler through hole 502 may be a through hole defined in the anchor 102 that allows portion of the coupler 104 to extend there through. Further, in one aspect of this disclosure the coupler through hole is partially defined through the elastic member receiver 212. Accordingly, the anchor coupling portion 204 of the elastic member 108 may also have a through hole that allows the coupler 104 to extend there through when the elastic member 108 is coupled to the anchor 102.

In one aspect of this disclosure, the coupler 104 may be entirely surrounded by the elastic member 108 at both the sleeve coupling portion 202 and the anchor coupling portion 204 when the anchor assembly 100 is coupled to a wall. That is to say, the elastic member 108 defines a through hole therein along the coupler axis 212 and has material entirely surrounding the through hole at both the sleeve coupling portion 202 and the anchor coupling portion 204.

One non-exclusive method of installing the anchor assembly 100 in a wall includes first drilling a through hole in the wall to provide access to the hollow portion of the wall. The wall may be drywall, tile, cement board, plaster, wood, cement, or any other wall that has a hollow region or the like. The through hole will have a diameter that is about the same as the diameter of the body portion of the sleeve 106. Then, the coupler 104 and trim 110 may be removed from the anchor 102 (if positioned therein), and the anchor 102 and the sleeve 106 may be elastically coupled to one another with the elastic member 108.

The anchor 102 may then be aligned with the through hole in the wall and pushed therein. As the anchor 102 enters the through hole of the wall, the elastic member 108 may stretch while the sleeve 106 remains at least partially on the exterior side of the though hole. The anchor 102 may be forced all of the way through the through hole and into the hollow portion of the wall. Then, the elastic member 108 may pull the sleeve 106 at least partially into the through hole until the flange 316 contacts an outer surface of the wall. At this point, the anchor 102 may be aligned with the inner surface of the wall while the flange 316 is aligned with the outer surface of the wall and the elastic member 108 may pull the sleeve 106 and the anchor 102 towards one another, thereby compressing the wall between the two. Next the coupler 104 may be placed through the trim 110. Then, the coupler may be positioned through the sleeve 106, through the through hole of the wall, and engage the anchor 102. The coupler 104 may then be tightened to the anchor 102, thereby drawing the trim 110 towards the wall until the trim is tightly coupled to the wall through the anchor 102.

An anchor element such as an ornamental object or grab bar may be at least partially positioned between the trim 110 and the wall to thereby couple the same thereto. However, many different methods are considered herein for anchoring a component to a wall using the disclosed anchor assembly 100 and the trim 110 of this disclosure is only one non-exclusive example of a component that can be coupled to the anchor assembly 100 with the coupler 104. More specifically, the anchor 100 disclosed herein may be used to anchor any type of component to a wall or other surface having a thickness. In one non-exclusive example, the anchor 100 couples a hand rail to a wall. In yet another example, the anchor 100 couples a decoration to a wall. Accordingly, this disclosure contemplates using the anchor 100 to couple any component to a wall or the like surface.

While exemplary embodiments incorporating the principles of the present disclosure have been described herein, the present disclosure is not limited to such embodiments. Instead, this application is intended to cover any variations, uses, or adaptations of the disclosure using its general principles. Further, this application is intended to cover such departures from the present disclosure as come within known or customary practice in the art to which this disclosure pertains.

The invention claimed is:

1. A wall anchor assembly, comprising:
a sleeve defining an elastic member receiver therein, the elastic member receiver having a first channel and a second channel defined therein;
an anchor elastically coupled to the sleeve with an elastic member;
wherein, the elastic member defines a sleeve coupling portion that is substantially circular and couples the elastic member to the sleeve;
wherein, the first and second channel are sized to at least partially receive the sleeve coupling portion of the elastic member;
wherein, the first and second channels are substantially arc-shaped and separated from one another by a first longitudinal opening and a second longitudinal opening.

2. The wall anchor assembly of claim 1, further wherein the elastic member receiver couples the sleeve coupling portion of the elastic member around a sleeve axis defined by the sleeve.

3. The wall anchor assembly of claim 1, further comprising at least one retention tab defined in the elastic member receiver, wherein the retention tab at least partially prevents the sleeve coupling portion from being removed from the first or second channel.

4. The wall anchor assembly of claim 1, further wherein the sleeve coupling portion of the elastic member is coupled to an anchor coupling portion of the elastic member by a first and second extension, wherein the first extension is at least partially positioned in the first longitudinal opening and the second extension is at least partially positioned in the second longitudinal opening.

5. The wall anchor assembly of claim 4, further wherein the anchor coupling portion of the elastic member is coupled at least partially around the anchor.

6. The wall anchor assembly of claim 1, further wherein the sleeve defines a through-hole and the anchor has a width, wherein the through-hole is equal to or less than the width of the anchor.

7. An assembly for anchoring a component to a structure, comprising:
an anchor having an anchor width;
a sleeve having a through hole defined there through
an elastic member receiver defined in the sleeve and having a first channel and a second channel; and
an elastic member coupling the anchor to the sleeve, the elastic member having a sleeve coupling portion that is substantially circular and couples the elastic member to the sleeve;
wherein, the width of the anchor is greater than the through hole of the sleeve
wherein, the first and second channel are sized to at least partially receive the sleeve coupling portion of the elastic member;
wherein, the first and second channels are substantially arc-shaped and separated from one another by a first longitudinal opening and a second longitudinal opening.

8. The assembly of claim 7, further wherein the sleeve coupling portion is removably coupleable to the sleeve.

9. The assembly of claim 7, further wherein the sleeve has a sleeve width that is about the same as the anchor width.

10. The assembly of claim 7, further wherein the anchor is configured to be positioned entirely through a through hole in a structure before the sleeve is at least partially positioned within the through hole.

11. The assembly of claim 7, further wherein the sleeve coupling portion is selectably coupleable to the sleeve and has an anchor coupling portion that is selectively coupleable to the anchor.

12. The assembly of claim 11, further wherein a coupler is positionable at least partially through the sleeve and the anchor, wherein the elastic member substantially entirely surrounds the coupler at the sleeve coupling portion and the anchor coupling portion.

* * * * *